United States Patent Office 3,595,970
Patented July 27, 1971

3,595,970
PROCESS FOR HARDENING EPOXY RESINS WITH FLUOPHOSPHORIC ACID
Ernst Nolken, Frankfurt am Main, Germany, assignor to Farbwerke Hoechst Aktiengesellschaft vormals Meister Lucius & Bruning, Frankfurt am Main, Germany
No Drawing. Filed May 19, 1969, Ser. No. 825,938
Claims priority, application Germany, May 28, 1968,
P 17 70 506.5
Int. Cl. C08g 30/12
U.S. Cl. 260—47                7 Claims

ABSTRACT OF THE DISCLOSURE

Process for hardening epoxy compounds having more than one epoxy group per molecule, if desired with addition of lactones or copolymerizable cyclic ethers, comprising using fluophosphoric acid, if desired in admixture with acid phosphorus compounds as hardener for epoxy resin to provide for low temperature hardening, increased hardening rate, and improved mechanical properties of the hardened resin.

---

The present invention relates to a process for hardening epoxy resin compounds.

In most cases, epoxy resins are hardened by means of amines, polyvalent phenols or dicarboxylic acid anhydrides, such as maleic acid anhydride, phthalic acid anhydride or alkenyl-succinic acid anhydrides. The amines may be mono- and poly-functional and may have primary, secondary or even tertiary amino groups. It has also been proposed to use, as hardeners, polyamides, organic and inorganic acids, such as carboxylic acids, sulfonic acids, for example benzene-1,3-disulfonic acid, phosphoric acid, phosphoric acid monoesters and phosphonic acids as well as Lewis acids, such as boron trifluoride and complex compounds thereof with ethers, alcohols, phenols, carboxylic acids and amines.

Generally, the amines and dicarboxylic acid anhydrides are hardened with the supply of heat or, in order to achieve optimum properties, after-hardening with further supply of heat is necessary in the exothermic hardening process with aliphatic amines. Hardening of epoxy resins with phosphoric acid, phosphoric acid monoesters and phosphonic acids is also an exothermic reaction as is the reaction with Lewis acids, such as boron trifluoride and complex compounds thereof with ethers, alcohols, phenols, carboxylic acids and carboxylic esters. However, it appeared that hardening of epoxy resins with Lewis acids, such as $BF_3 \cdot xO(C_2H_5)_2$, even if this compound is used in a solution with further diethyl ether to improve mixing with the epoxy resin, is not complete at 30° C. and after 15 minutes only 43% and after 60 minutes only 60% of the epoxy groups have reacted. The incomplete conversion is said to be due to a rapid and high increase in viscosity during the reaction, the increasing viscosity being due to a tridimensional cross-linking. The mobility of the polymer chains is strongly reduced thereby and the degree of hardening begins to depend on the possible diffusion of the polymer molecules. Only after further heating to 120° C., complete conversion and, hence, optimum properties are obtained. Furthermore, shaped articles of epoxy resins that have been hardened with Lewis acids as catalysts have a strong tendency to crack growth due to tensions.

However, the reaction of epoxy resins with phosphoric acid monesters or phosphonic acid permits a complete conversion of the epoxy groups with exothermic hardening. The hardened products are distinguished by good mechanical properties and a high thermal stability. Compared with the products hardened with amines, they have, however, the disadvantage of a poorer resistance to solvents and alkalies.

It is, moreover, known to copolymerize epoxy resins with cyclic ethers, such as oxiranes, oxacyclobutane and derivatives thereof as well as tetrahydrofurane and lactones. However, when Lewis acids are used as catalysts or phosphoric acid or polyphosphoric esters are used as hardeners, the copolymerization does not provide valuable hardened products.

The present invention provides a process for hardening epoxy compounds having more than one epoxy group per molecule with the optional addition of lactones or copolymerizable cyclic ethers, which comprises completely reacting the epoxy groups without supply of external heat and using fluophosphoric acid, optionally in admixture with acid phosphorous compounds, as hardener. The products obtained have an increased resistance to alkalies.

By epoxy resins there are understood compounds having more than one, generally at most 10, epoxy groups per molecule, for example reaction products of epichlorohydrin and polyhydric alcohols and, in particular, with mono- and polynuclear polyphenols. Di- and polyglycidic esters may also be used. Suitable for the manufacture of hardened products are compounds which are obtained by epoxidation of di- and polyolefins, dienes, cyclic dienes and diolefininically unsaturated carboxylic acid esters. Furthermore, telomers and cotelomers containing glycidic ether and/or glycidic ester groups may be used. Reaction products of 2,2-diphenylolpropane with epichlorohydrin are preferably used.

For the hardening, epoxy resins that are liquid at room temperature and have epoxy equivalents of from 100 to 300 are especially used. It is, however, also possible to use solid epoxy resins having higher epoxy equivalents provided that they can be brought into the liquid state by adding solvents or comonomers.

The fluophosphoric acid is an acid that is easy to obtain. It may be prepared by usual methods disclosed in the literature, for example from phosphorus pentoxide and 69%-aqueous hydrofluoric acid, phosphoroxy trifluoride and orthophosphoric acid, from metaphosphoric acid and hydrofluoric acid, orthophosphoric acid and difluophosphoric acid. It proved to be advantageous to prepare the fluophosphoric acid by reacting aqueous hexafluophosphoric acid having from 65 to 75% strength with pyrophosphoric acid and polyphosphoric acid. This preparation is, however, not part of the present invention.

The commercial acid referred to as monofluophosphoric acid which corresponds to the empirical formula $FPO(OH)_2$ according to the elementary analysis, also contains small amounts of orthophosphoric acid and difluophosphoric acid, as nuclear reasonance measurements have shown.

The fluophosphoric acid may be directly added to the epoxy resin which optionally contains a lactone or a copolymerizable cyclic ether. It is, however, advantageous to add the fluophosphoric acid together with a solvent or a complex-forming agent.

Suitable solvents or complex-forming agents are ethers, such as diethyl ether, diisopropyl ether, dioxane, ethyleneglycol dimethyl ether, diethylene glycol dimethyl ether, diethylene-glycol diethel ether; ketones such as acetone, methylethyl-ketone, methylisobutyl-ketone; esters such as methyl- and ethyl-formiates, methyl-, ethyl-, butyl- and phenyl-acetates, glycol-monoacetate, oxalic acid diethyl ester, succinic acid diethyl ester or adipic aid diethyl ester.

However, it is especially advantageous to use the fluophosphoric acid as a solution in monomers capable of copolymerizing with the epoxy resin, such as cyclic ethers and lactones, or as a solution in compounds that react with the epoxy resin by polyaddition, for example alkylphosphonic acids, phosphoric acid monoesters or bisphenols.

The lactones used may be β-propiolactone, 3-methyl-β-propionlactone, 4-methyl-β-propiolactone, 3,3-dimethyl-β-propiolactone, 4-trichloromethyl-β-propiolactone, 4,4-bis-(trichloromethyl)-β-propiolactone, γ-butyrolactone, δ-valerolactone, 2-methyl-δ-valerolactone, monomethyl-, monoethyl-, monopropyl-, monoisoporpyl- up to monododecyl-ε-caprolactone, dialkyl-ε-caprolactones in which the two alkyl groups are linked to the same or to different carbon atoms, but not both to the ε-carbon atom, trialkyl-ε-caprolactones in which two or three carbon atoms in the lactone ring are substituted, alkoxy-ε-caprolactones such as methoxy- and ethoxy-ε-caprolactones, cycloalkyl-, aryl- and aralkyl-ε-caprolactones such as cyclohexyl-, phenyl- and benzyl-ε-caprolactones. Lactones with more than 6 carbon atoms in the ring may also be used, such as ζ-enatolactone and η-caprilactone.

As the monomer in which the fluophosphoric acid may be dissolved and mixed with the epoxy resin, ε-caprolactone has proved especially advantageous.

As solvents copolymerizable with the epoxy resin, there are, furthermore, used for the catalyst cyclic ethers copolymerizable with the epoxy resin, such as propylene oxide, epichlorohydrin, phenyl-glycidyl ethers, oxyacyclobutane, 3-methyl-oxyacyclobutane, 3,3-dimethyl-oxyacyclobutane, 3,3-bis-(chloromethyl)-oxyacyclobutane and tetrahydrofuran.

The heat which is set free upon addition of the above comonomers to the catalyst may be dissipated at room temperature or at lower temperatures, for example at −10° C. The solution may directly be used for hardening the epoxy resin; it is, however, also possible first to polymerize the monomer and then use the prepolymer for hardening.

As with fluophosphoric acid the above comonomers may also be combined with the epoxy resin in amounts of from 1 to 30% by weight.

Further solvents that are reactive, i.e. capable of polyaddition with epoxy resins, and suitable for the catalyst are phosphonic acids, such as methyl-, ethyl-, vinyl-, 2-chloroethyl-, propyl-, butyl-, phenyl-, hydroxymethane-, α-hydroxyethane-, α-hydroxypropane- and α-hydroxy-α-phenylmethane phosphonic acid or monoalkyl-, monocycloalkyl- and monoaryl esters of the phosphonic acid, such as methyl-, ethyl-, propyl-, isopropyl-, n-butyl-, isobutyl-, tertiary butyl-, methoxyethyl-, butoxyethyl-, phenyl-, 2-methylphenyl-, 3-methylphenyl-, 2,4,6-trichlorophenyl- or 2,4,6-tribromophenyl ester. As phosphoric acid esters there may also be used the phosphoric acid monoesters containing a proportion of diesters and which are obtained by the reaction of phosphorus pentoxide with alcohols or phenols.

Furthermore, the following phosphorous compounds may be used: Orthophosphoric acid, phosphorous acid, pyrophosphoric acid, polyphosphoric acid, polyphosphoric acid esters, such as tetraalkylidiphosphoric acid or hexaalkyltetraphosphoric acid, which are obtained by the reaction of trialkyl-phosphates with phosphorus pentoxide in the corresponding quantitative ratios. However, acid polyphosphoric acid esters of di-, tri-, tetra- and pentaphosphoric acid may also be used, which are obtained by the reaction of phosphoric acid mono- and diesters with $P_2O_5$ or phosphoric acid mono-, di- and trialkyl esters with polyphosphoric acid which is easier to treat than $P_2O_5$. In addition to the alkyl ester of the above polyphosphoric acid derivatives the alkyl groups of which have from 1 to 10 carbon atoms and which may be linear or branched and substituted by halogen, there may also be used aryl esters, such as phenyl-, methylphenyl-, chlorophenyl- and 1,3,5-tribromophenyl ester. Furthermore, there may also be used reaction products of neutral and acid polyphosphoric acid esters with aliphatic and cycloaliphatic diols, triols, polyether diols and polyvalent phenols, such as resorcinol and polynuclear polyphenols, such as 4,4′-dioxydiphenylmethane or 4,4′-dioxydiphenyl-2,2-propane.

The concentration of fluorphosphoric acid in the lactone, cyclic ethers copolymerizable with the epoxy resin, solvents or the cited reactive phosphorus compounds is within the range of from 2 to 80, preferably 5 to 50% by weight, and the amount of catalyst is within the range of from 0.01 to 0.6 hydroxy equivalent of fluophosphoric acid, preferably from 0.02 to 0.3 hydroxy equivalent, calculated on the average epoxy equivalent of the resin used.

The cited phosphorus compounds which are used together with fluophosphoric acid may be used up to equivalent amounts, calculated on the epoxy resin, i.e. one hydroxy equivalent of the phosphorus compound per epoxy equivalent. As to the properties of the hardened products, it has, however, proved to be advantageous to use less than the equivalent amounts of the above phosphorus compounds, preferably from 0.1 to 0.6 hydroxy equivalent per epoxy equivalent.

The lactones and cyclic ethers copolymerizable with the epoxy resin may, of course, also be used together with the phosphorus compounds as solvents for the fluophosphoric acid.

Finally, the reaction products, known as novolaks, of mono- or polynuclear mono- or polyvalent phenols with formaldehyde may also be added to the hardening components.

The resin may be mixed with the hardening mixture by means of a suitable stirrer, preferably a high-energy stirrer. It is, however, also possible to use suitable devices for mixing, for example an injection gun provided with a separate supply for resin and hardener which allows the components to be mixed and then applied to the surface to be coated.

Generally, the mixture can be stirred for 10 seconds to 3 minutes until hardening begins with an increase in temperature. This time is sufficient for a thorough homogeneous mixing. The exothermic hardening reaction sets in at room temperature. The components to be mixed may have the same or different temperatures, for example of from 5 to 45° C., preferably from 10 to 35° C. The hardening mixture is either conveyed to a mold to take a definite shape or poured onto a substrate to form a film or sprayed onto a variety of materials, such as metals, ceramics, textile materials, paper, glass wool or fibrous fleeces.

The pot life of the hardening mixture depends on the epoxy resin used, the hardener- and comonomer concentration and the chosen initial temperature of the individual components. The maximum temperature in the hardened product is usually reached after 20 seconds to 3 minutes and the cross-linking reaction yielding the solid hardened product, is complete after 1 to 10 minutes even at room temperature.

In comparison with known processes wherein preferably liquid epoxy resins are hardened with Lewis acids at room temperature without the supply of external heat by adding the Lewis acid in solution in special solvents or plasticizers, such as ethyl acetate, butyl acetate, methylethyl-ketone, butanol, chlorinated polyphenols and dibutylphthalate, to the epoxy resin, the process of the present invention is distinguished, besides the exothermic reaction, the high polymerization rate and the short reaction time of, for example, some minutes, by the fact that the phosphorus compounds to be used according to the invention are incorporated into the resin by polyaddition with the epoxy groups, hence the hardened products do not contain solvents nor exuding plasticizers and, therefore, do not require after-hardening nor drying.

Furthermore, the mixtures to be used according to the invention are distinguished by a good processability and the hardened products obtained by their good mechanical properties and their little tendency to crack growth in the molded article. Moreover, the fluophosphoric acid imparts self-extinguishing properties to the hardened product.

The hardened products prepared according to the invention have a good adhesion to materials, such as steel, aluminum, cardboard, stone, ceramics and plastic materials.

It is also possible to add dyestuffs and fillers, such as wood-wool, talcum, asbestos, kieselguhr, aluminum powder, soot, iron oxide or titanium dioxide, to the epoxy resin or to the hardening mixture. The products prepared according to the invention can be used for coating textile materials, paper, metals, wood and plastics, for enameling, strengthening fleeces, reinforcing glass fibers, cementing and impregnating a variety of materials. The coatings are distinguished by a good hardness, strength and brilliance as well as by excellent resistance to the action of acids, bases and organic solvents. No decolorations occur as do, in many cases, with resins hardened with amines. For use as coatings having a good antioxidant and anticorrosive effect, higher than equivalent amounts of phosphorus compounds are advantageously employed so that free acid groups are still available for a reaction and adhesion to metal.

The following examples serve to illustrate the invention, but they are not intended to limit it thereto, the parts and percentages being by weight unless stated otherwise.

EXAMPLE 1

100 parts of epoxy resin having an epoxy equivalent of 192 and a medium molecular weight of 380, which substantially is the diglycidic ether of 4,4'-dioxidiphenyl-2,2-propane, were mixed at 25° C. with a solution of 5 parts of monofluophosphoric acid in 30 parts of ε-caprolactone within 30 seconds by means of a high-energy stirrer and the mixture was poured into a mold. With a rise in temperature the viscosity of the resin/hardener composition began at once to increase, after 60 seconds the shaped article had become solid and, still hot, exhibited a good elasticity. After cooling, the mold consisting of glass could easily be removed. A clear shaped article was obtained that was free from shrinkage and cracks and had a high brilliance, good hardness and elasticity. The softening temperature according to Vicat was 92° C.

EXAMPLE 2

1,000 parts of the epoxy resin disclosed in Example 1 were mixed at 25° C. within 45 seconds with a solution of 28 parts of monofluophosphoric acid and 12 parts of orthophosphoric acid in 50 parts of ε-caprolactone and the mixture was poured into a mold. The exothermic hardening reaction began at once. After cooling, a shaped article free from shrinkage and crack growth and having a volume of about 1 liter was obtained. The softening temperature according to Vicat was 83° C.

EXAMPLE 3

1,000 parts of the epoxy resin disclosed in Example 1 were mixed at 25° C. within 40 seconds with a solution of 28 parts of monofluophosphoric acid and 50 parts of vinylphosphonic acid in 100 parts of ε-caprolactone. After pouring into a mold, hardening began with an increase in temperature. After 2 minutes the shaped article had become solid. Still hot, it exhibited a good elasticity. After cooling a clear shaped article free from shrinkage and crack growth and having a good hardness was obtained.

EXAMPLE 4

The process was carried out as in Example 2, except that 300 parts, instead of 50 parts, of ε-caprolactone were uesd. The mixing time was 115 seconds. The softening temperature of the shaped article according to Vicat was 96° C.

We claim:

1. In a process for hardening an epoxy resin comprised of an epoxy compound having more than one epoxy group per molecule and as optional additives therefore (a) a lactone selected from the group consisting of a propiolactone, a butyrolactone, a valerolactone, a caprolactone, an enatolactone, and a caprilactone and (b) a cyclic ether copolymerizable with the epoxy resin selected from the group consisting of propylene oxide, epichlorohydrin, a phenyl-glycidyl ether, an oxacyclobutane, and tetrahydrofuran, the improvement of which comprises hardening said epoxy resin by admixing the epoxy resin with monofluophosphoric acid in an amount from 0.01 to 0.6 hydroxy equivalents thereof, calculated on the average epoxy equivalent of said resin.

2. In the process as defined in claim 1, and wherein in addition to said fluophosphoric acid, an acid phosphorus compound is used in an amount, equivalent up to the average epoxy equivalent of the resin used.

3. In the process as defined in claim 1 and wherein said fluophosphoric acid is dissolved in a caprolactone and admixed with said epoxy resin.

4. In the process as defined in claim 3 and wherein said fluophosphoric acid is dissolved in ε-caprolactone and admixed with said epoxy resin.

5. In the process as defined in claim 1 and wherein the (a) or (b) additives are from 1 to 30% by weight based on the epoxy resin.

6. The product produced by the process as defined in claim 1.

7. The product produced by the process as defined in claim 2.

References Cited

UNITED STATES PATENTS 2,541,027   2/1951   Bradley _____ 260—2EpC.
3,311,573   3/1967   Graham et al.

WILLIAM H. SHORT, Primary Examiner

T. E. PERTILLA, Assistant Examiner

U.S. Cl. X.R.

117—127, 155, 161; 260—2, 831